(12) United States Patent
Persson et al.

(10) Patent No.: US 7,662,306 B2
(45) Date of Patent: Feb. 16, 2010

(54) POLYSILICATE MICROGELS

(75) Inventors: Michael Persson, Göteborg (SE); Bozena Stanislawa Tokarz, Kungälv (SE); Maj-lis Dahlgren, Nödinge (SE); Hans Johansson-Vestin, Kungälv (SE)

(73) Assignee: Akzo Nobel NV, Arnhem (NL)

( * ) Notice: Subject to any disclaimer, the term of this patent is extended or adjusted under 35 U.S.C. 154(b) by 1115 days.

(21) Appl. No.: 09/455,102

(22) Filed: Dec. 6, 1999

(65) Prior Publication Data

US 2003/0025103 A1 Feb. 6, 2003

Related U.S. Application Data

(63) Continuation of application No. PCT/SE98/01101, filed on Jun. 8, 1998.

(60) Provisional application No. 60/049,240, filed on Jun. 9, 1997.

(30) Foreign Application Priority Data

Jun. 9, 1997 (EP) ................................ 97850092

(51) Int. Cl.
 *C01B 33/143* (2006.01)
 *C01B 33/152* (2006.01)
 *C01B 33/155* (2006.01)
 *C09K 3/00* (2006.01)
 *D21H 21/10* (2006.01)
 *C02F 1/52* (2006.01)

(52) U.S. Cl. ................. 252/194; 162/181.6; 423/330.1; 423/333; 423/338; 516/110; 516/111

(58) Field of Classification Search .................. 516/110, 516/111; 252/181, 194; 162/181.6; 423/330.1, 423/338, 333, 332; 106/813; 428/402; 502/235, 502/405, 70
See application file for complete search history.

(56) References Cited

U.S. PATENT DOCUMENTS

| | | | | |
|---|---|---|---|---|
| 2,601,235 A * | 6/1952 | Alexander et al. | ............. | 516/82 |
| 2,630,410 A | 3/1953 | Clapsadle et al. | ............. | 516/86 |
| 2,727,008 A * | 12/1955 | Iler | ............. | 516/83 |
| 2,750,345 A * | 6/1956 | Alexander | ............. | 516/83 |
| 3,857,925 A * | 12/1974 | Sirianni et al. | ............. | 423/338 X |
| 4,285,919 A | 8/1981 | Klotz et al. | ............. | 423/277 |
| 4,388,150 A | 6/1983 | Sunden et al. | ............. | 162/175 |
| 4,554,211 A * | 11/1985 | Arika et al. | ............. | 516/111 X |
| 4,750,974 A * | 6/1988 | Johnson | ............. | 162/181.6 X |
| 4,871,694 A * | 10/1989 | Legare | ............. | 516/110 X |
| 4,927,498 A | 5/1990 | Rushmere | ............. | 162/168.3 |
| 4,954,220 A | 9/1990 | Rushmere | ............. | 162/168.3 |
| 4,954,327 A * | 9/1990 | Blount | ............. | 516/111 X |
| 4,961,825 A | 10/1990 | Andersson et al. | ............. | 162/175 |
| 4,963,515 A * | 10/1990 | Helferich | ............. | 516/110 X |
| 4,980,025 A | 12/1990 | Andersson et al. | ............. | 162/168.3 |
| 5,116,418 A * | 5/1992 | Kaliski | ............. | 106/419 |
| 5,127,994 A | 7/1992 | Johansson | ............. | 162/168.3 |
| 5,160,455 A * | 11/1992 | Clark et al. | ............. | 516/111 X |
| 5,176,891 A | 1/1993 | Rushmere | ............. | 423/328.1 |
| 5,240,561 A * | 8/1993 | Kaliski | ............. | 162/181.6 X |
| 5,279,807 A | 1/1994 | Moffett et al. | ............. | 423/338 |
| 5,312,595 A | 5/1994 | Moffett et al. | ............. | 422/129 |
| 5,368,833 A | 11/1994 | Johansson et al. | ............. | 423/338 |
| 5,447,604 A | 9/1995 | Johansson et al. | ............. | 162/181.6 |
| 5,470,435 A | 11/1995 | Rushmere et al. | ............. | 162/181.6 |
| 5,482,693 A | 1/1996 | Rushmere et al. | ............. | 423/328.1 |
| 5,503,820 A | 4/1996 | Moffett et al. | ............. | 423/333 |
| 5,543,014 A | 8/1996 | Rushmere et al. | ............. | 162/181.6 |
| 5,571,494 A | 11/1996 | Saastamoinen | ............. | 423/338 |
| 5,626,721 A | 5/1997 | Rushmere et al. | ............. | 162/181.6 |
| 5,846,384 A | 12/1998 | Schold et al. | ............. | 162/175 |
| 6,083,997 A | 7/2000 | Begala et al. | ............. | 516/79 |
| 6,200,420 B1 | 3/2001 | Begala et al. | ............. | 162/164.1 |
| 6,270,627 B1 | 8/2001 | Keiser et al. | ............. | 162/181.6 |
| 6,310,104 B1 | 10/2001 | Keiser et al. | ............. | 516/79 |

(Continued)

FOREIGN PATENT DOCUMENTS

EP   0 359 552   3/1990

(Continued)

OTHER PUBLICATIONS

MSDS, J.T.Baker online @ www.jtbaker.com/msds/englishhtml/s4982.htm , pp. 1-7, printed Apr. 24, 2006.*
Iler, The Colloid Chemistry of Silica and Silicates, Cornell University Press, Ithica, NY (Jul. 1955), pp. 20-21 & 26-27.*
Hackh's Chemical Dictionary, edited by Julius Grant, McGraw-Hill Book Co, NY, NY, copyright 1972 (received Dec. 1979), p. 610, silicate entry.*
The PQ Corporation at www online @ <http://www.pqcorp.com/msds/stixso_rr_sodium_silicate.pdf>, pp. 5 of 5, Dec. 2007.*
OxyChem at www online @ <http://www.chemistrystore.com/ChemicalMSDS/SodSil.pdf>, pp. 12 of 12, Dec. 2007.*
*Abstract*, publication No. 60251119, dated Dec. 11, 1985.
*Microgels*, vol. 77, No. 12 Tappi Journal, Moffett R. J. *On-site production of a silica-based microparticulate retention and drainage aid*, Dec. 1994.

*Primary Examiner*—Daniel S Metzmaier
(74) *Attorney, Agent, or Firm*—Robert C. Morriss; Lainie E. Parker; Ralph J. Mancini

(57) ABSTRACT

The present invention generally relates to polysilicate microgels. More specifically, the invention relates to a process for preparing aqueous polysilicate microgels which comprises mixing an aqueous solution of alkali metal silicate with an aqueous phase of silica-based material having a pH of 11 or less, to polysilicate microgels per se and to the use thereof as flocculating agents in paper making and water purification. The invention further relates to a process for the production of paper from a suspension of cellulosic fibers, and optional filler, which comprises adding to the suspension at least one cationic or amphoteric organic polymer and a polysilicate microgel, forming and draining the suspension on a wire.

25 Claims, No Drawings

U.S. PATENT DOCUMENTS

| | | |
|---|---|---|
| 6,358,364 B2 | 3/2002 | Keiser et al. .............. 162/181.6 |
| 6,361,652 B2 | 3/2002 | Keiser et al. .............. 162/181.6 |
| 6,361,653 B2 | 3/2002 | Keiser et al. .............. 162/181.6 |
| 6,372,805 B1 | 4/2002 | Keiser et al. .................. 516/79 |
| 6,673,208 B2 * | 1/2004 | Persson et al. ........... 162/181.6 |
| 7,169,261 B2 * | 1/2007 | Persson et al. ................ 516/81 |
| 2001/0023752 A1 | 9/2001 | Keiser et al. ............. 162/181.6 |
| 2001/0023753 A1 | 9/2001 | Keiser et al. ............. 162/181.6 |
| 2001/0030032 A1 | 10/2001 | Keiser et al. ............. 162/181.6 |
| 2003/0024671 A1 * | 2/2003 | Persson et al. ........... 162/181.6 |

FOREIGN PATENT DOCUMENTS

| | | |
|---|---|---|
| JP | 74039757 | 10/1974 |
| JP | 1987-83311 | 4/1987 |
| WO | WO 89/06637 | 7/1989 |
| WO | WO 91/07350 | 5/1991 |
| WO | WO 91/07351 | 5/1991 |
| WO | WO 94/05596 | 3/1994 |
| WO | WO 98/56715 | * 12/1998 |

* cited by examiner

POLYSILICATE MICROGELS

The present application is a continuation of International Patent Application No. PCT/SE98/01101, filed on 08 Jun. 1998, and now abandoned, which claims priority of European Patent Application No. 97850092.4, filed on Jun. 9, 1997, and U.S. Provisional Patent Application No. 60/049,240, filed on Jun. 9, 1997.

FIELD OF THE INVENTION

The present invention generally relates to polysilicate microgels. More particularly, the invention relates to polysilicate microgels, their preparation and use in paper making and water purification.

BACKGROUND OF THE INVENTION

Polysilicate microgels, optionally aluminated, are known in the art as drainage and retention aids in the manufacture of paper and similar cellulosic products. The microgels comprise solutions or dispersions of very small primary silica-based particles, usually with a size of from 1 to 2 nm in diameter and having a high specific surface area, typically at least about 1000 $m^2/g$, which are linked together into individual chains to form three-dimensional network structures.

The preparation of polysilicate and aluminated polysilicate microgels generally comprises acidifying a dilute aqueous solution of alkali metal silicate by using an acid or acid ion-exchanger, ageing the acidified mixture and then further diluting the aged mixture to a silica concentration of not greater than 2% by weight. The silica-based microgels normally have poor stability and the high dilution is normally necessary to avoid gelation of the microgels. Because of the stability problems associated with these products, and the prohibitive cost of shipping stable, but extremely dilute, solutions containing about 0.5% by weight or less of silica, the polysilicate microgels are preferably prepared at the location of intended use, for example at the paper mill. Production units or generators for continuously preparing polysilicate microgels that are installable at the paper mill are known in the art. Hereby the microgels obtained can be prepared and continuously introduced into the stock containing cellulosic fibres and filler to be drained. However, any disturbance in the production unit, for example variations in quality and/or quantity of the microgel produced, will change the drainage and retention performance of the product which may adversely affect the paper making process, thereby producing cellulosic products of uneven quality.

SUMMARY OF THE INVENTION

The present invention generally relates to polysilicate microgels, to a process for preparing an aqueous polysilicate microgel which comprises mixing an aqueous solution of alkali metal silicate with an aqueous phase of silica-based material preferably having a pH of 11 or less, and to a process of using the polysilicate microgels in papermaking and water purification.

DETAILED DESCRIPTION OF THE INVENTION

In accordance with the present invention it has been found that polysilicate microgels can be prepared in a very advantageous manner by mixing an alkaline alkali metal silicate with a silica-based material. Hereby it is possible to prepare high-concentration polysilicate and aluminated polysilicate microgels and microgel precursors. More specifically, this invention concerns a process for preparing an aqueous polysilicate microgel which comprises mixing an aqueous solution of alkali metal silicate with an aqueous phase of silica-based material preferably having a pH of 11 or less. The invention thus relates to a process for preparing polysilicate microgels, polysilicate microgels per se and their use, as further defined in the claims.

The polysilicate microgels of this invention exhibit very high stability and can be easily prepared and shipped at considerably higher silica concentrations as compared to previously known polysilicate microgels. High-concentration polysilicate microgels of this invention can be prepared under controlled conditions in a plant intended for such production and shipped as a concentrated product to the paper mill in an economically attractive manner. Hereby there will be no need for installing production units or generators for preparing polysilicate microgel drainage and retention aids in a large number of paper mills, thereby offering substantial technical and economic benefits.

If desired, the high-concentration polysilicate microgel of this invention can be diluted with water or an aqueous acid solution before being used, for example as a drainage and retention aid in papermaking, in order to facilitate dosage of the silica-based material to the dilute fibre stock. In this respect, the high-concentration polysilicate microgel of the invention can be regarded as a precursor for low-concentration polysilicate microgels which can be formed by the addition of water, optionally acidified. In this application, a storage tank for the high-concentration polysilicate microgel can be installed at the location of intended use, which is more attractive economically than installing a complete polysilicate microgel production unit or generator. Of course, low-concentration polysilicate microgels can also be formed in situ in the aqueous phase into which the high-concentration silica-based product is being incorporated as a high-performance additive, for example by adding the high-concentration product to a cellulosic fibre suspension to be drained in papermaking or to waste water to be purified. This application using high-concentration polysilicate microgels of this invention as a precursor for in situ formation of low-concentration polysilicate microgels represents a significant progress in the art.

The alkali metal silicate used to prepare the polysilicate microgels according to the invention can be any water-soluble silicate salt such as sodium or potassium silicate, or sodium or potassium water glass. These are available with varying molar ratios of $SiO_2$ to $Na_2O$ or $K_2O$ and the molar ratio is usually within the range of from 1.5:1 to 4.5:1, most often from about 2.5:1 to 3.9:1. The alkali metal silicate preferably is a sodium silicate. Aqueous solutions of alkali metal silicate are alkaline and usually have a pH of about 13 or above 13. The alkali metal silicate solution usually have a silica concentration within the range of from 5 to 35% by weight, suitably above 10% by weight and preferably within the range of from 15 to 30% by weight.

The silica-based material to be mixed with the alkali metal silicate solution according to the invention can be selected from a wide variety of siliceous materials including dispersed silicas such as, for example, silica-based sols, fumed silica, silica gels, precipitated silicas, acidified solutions of alkali metal silicates, and suspensions of silica-containing clays of smectite-type. The aqueous phase of silica-based material can have a pH within the range of from 1 to 11. In one preferred aspect of this invention, the pH of the aqueous silica-based material is within the range of from 1.5 to 4. In another preferred aspect of this invention, the pH of the aqueous silica-based material is within the range of from 4 to 11.0, usually from 4.5, suitably from 6.5 and most preferably from 7 up to 11.0, preferably up to 10.6.

In one preferred embodiment of this invention, the silica-based material used for mixing with the alkali metal silicate solution is a silica-based sol, suitably an alkali-stabilized silica sol. Sols of this type are known in the art and generally comprise an aqueous phase and particles based on silica, i.e. $SiO_2$. It is preferred that the particles are colloidal, i.e. in the colloidal range of particle size. Particles of this type include colloidal silica, colloidal aluminium-modified silica and colloidal aluminium silicate. The silica-based sols can have a pH as defined above and usually it is at least 4. Suitable sols with silica-based particles include those disclosed in U.S. Pat. Nos. 4,388,150; 4,961,825; 4,980,025; 5,368,833; 5,447,604; and 5,603,805; the teachings of which are incorporated herein by reference.

The silica-based particles contained in the sol can have an average particle size less than about 100 nm and suitably less than about 50 nm. In a preferred embodiment of the invention, the silica-based sol particles can have an average particle size of less than about 30 nm and preferably within the range of from about 1 to about 15 nm. As conventional in silica chemistry, the size refers to the average size of the primary particles, which may be aggregated or non-aggregated. The silica-based particles present in the sol should suitably have a specific surface area of at least 50 $m^2/g$. The specific surface area can be measured by means of titration with NaOH in known manner, e.g. as described by Sears in Analytical Chemistry 28(1956):12, 1981-1983 and in U.S. Pat. No. 5,176,891. The given area thus represents the average specific surface area of the particles. Suitably the specific surface area is within the range of from 50 to 1200 $m^2/g$ and preferably from 70 to 1000 $m^2/g$.

In another preferred embodiment of this invention, the silica-based material used for mixing with the alkali metal silicate solution is an acidified alkali metal silicate. Suitable acidified alkali metal silicates include polysilicic acid, polymeric silicic acid, active, or activated, silica, and polysilicates, optionally aluminated. The acidified alkali metal silicate solution can be prepared in known manner by acidifying an aqueous solution of alkali metal silicate which may be any water-soluble silicate salt such as sodium or potassium silicate, or sodium or potassium water glass, preferably sodium silicate. Suitable alkali metal silicates are available with varying molar ratios of $SiO_2$ to $Na_2O$ or $K_2O$ and the ratio is usually within the range of from 1.5:1 to 4.5:1, most often from about 2.5:1 to 3.9:1. The acidified alkali metal silicate solution can have a pH as defined above. Acidification can be carried out in many ways, for example by using acid ion-exchange resins, mineral acids, e.g. sulphuric acid, hydrochloric acid or phosphoric acid, acid salts or acid gases, suitably ion-exchangers or mineral acids or a combination thereof, optionally in combination with an aluminium salt. Where higher ratios of $SiO_2$ to $Na_2O$ are desired, it is preferred to use acid ion-exchangers. Suitable acidified alkali metal silicates include those disclosed in U.S. Pat. Nos. 4,388, 150; 4,954,220; 5,127,994: 5,279,807; 5,312,595; and 5,503, 820; the teachings of which are incorporated herein by reference.

Suitable acidified alkali metal silicate solutions can also be selected from alkali metal silicates that have been both acidified and aluminated. The alumination can be carried out simultaneously with or after the acidification. Suitable aluminated and acidified alkali metal silicates include aluminated polysilicates or polyaluminosilicates, for example as disclosed in U.S. Pat. Nos. 5,176,891; 5,470,435; 5,482,693; 5,543,014; and 5,626,921, the teachings of which are incorporated herein by reference.

Acidified, and optionally aluminated, alkali metal silicates for use in the process of this invention suitably have a high specific surface area, suitably above about 1000 $m^2/g$. The specific surface area can be within the range of from 1000 to 1700 $m^2/g$, preferably from 1050 to 1600 $m^2/g$. The specific surface area can be measured as described above.

The process of this invention comprises mixing the alkaline alkali metal silicate with the silica-based material. The mixing can be conducted at a temperature of from 0 to 300° C., suitably from 5 to 150° C. and preferably from about 10 to about 100° C. The process can be carried out by adding the silica-based material to the aqueous solution of alkali metal silicate with stirring. Preferably the silica-based material is slowly added to the alkali metal silicate under vigorous mixing. The aqueous phase of silica-based material can have a silica concentration within the range of from 0.1 to 60% by weight, depending on the type of material used. When using silica-based sols such as alkali-stabilized sols, the $SiO_2$ content can be from 5 to 60% by weight, preferably from 10 to 50% by weight. When using acidified alkali metal silicates as described herein, the $SiO_2$ content can be from 0.1 to 10% by weight, preferably from 0.5 to 6% by weight. The $SiO_2$ present in the polysilicate microgels obtained thus originates from both the alkali metal silicate and the silica-based material. The mixing can be carried out such that from 5 to 95% by weight and suitably from 15 to 85% by weight of $SiO_2$ present in the polysilicate microgel is derived from the alkali metal silicate, and 95 to 5% by weight and suitable from 85 to 15% of $SiO_2$ present in the polysilicate microgel is derived from the silica-based material.

If desired, additional compounds can be incorporated into the mixture obtained in the process. Suitable additional compounds include various salts such as, for example, aluminium salts and other metal salts, and various acids. These additional compounds may have a positive effect on storage stability and/or on the drainage and/or retention performance of the microgels. Suitable aluminium salts include alum, aluminates, aluminium chloride, aluminium nitrate and polyaluminium compounds, such as polyaluminium chlorides, polyaluminium sulphates, polyaluminium compounds containing both chloride and sulphate ions, polyaluminium silicate-sulphates, and mixtures thereof. The polyaluminium compounds may also contain other anions, for example anions from phosphoric acid, organic acids such as citric acid and oxalic acid. Preferred aluminium salts include aluminates, e.g. sodium or potassium aluminate, preferably sodium aluminate. Aluminium salts can be incorporated into the polysilicate microgels in an amount corresponding to a $SiO_2:Al_2O_3$ molar ratio within the range of from 1500:1 to 5:1 and suitably from 750:1 to 6:1. Suitable metal salts other than salts based on Al include those based on alkali metals and alkaline earth metals such as, for example, Li, K, Mg and Ca. Suitable anions can be selected from hydroxide, borate, nitrate, chloride, formate, acetate, etc. These additional compounds are generally incorporated in amounts such that the ratio of Na to such additional metal present in the metal salt is higher than 1, preferably higher than 5. Suitable acids include organic acids, preferably diacids such as dicarboxylic and disulphonic acids, e.g. oxalic, malonic, succinic, glutaric and adipic acid, and organic polyacids, such as polymers containing carboxylic acid and sulphonic acid groups, such as polyacrylic acid. The additional acid is suitably incorporated in the polysilicate microgels in an amount sufficient to give a positive effect on stability, suitably up to 10% by weight. Even if arbitrary order of mixing or addition can be used, it is generally preferred that these additional compound be incorporated in the mixture of alkali metal silicate and silica-based material. A further preferred order of mixing is to add the acid to the acidified solution of alkali metal silicate prior to mixing with the alkali metal silicate solution.

The resulting aqueous solution, or dispersion, of polysilicate microgel, or microparticulate silica-based material, optionally aluminated, normally have a $SiO_2$ content of a least 5% by weight. The $SiO_2$ content may depend on several factors such as, for example, the starting materials used and their $SiO_2$ content, the incorporation of aluminium salts, etc. Suitably the $SiO_2$ content is at least 10% by weight, preferably at least 15% by weight and most preferably at least 17.5% by weight. The upper limit is usually about 50% by weight, suitably about 35% by weight and in most cases about 30% by weight. If desired, after preparation, the aqueous polysilicate microgel can be subjected to further treatment like ion-exchange and/or concentration. This can be advantageous so as to provide products having improved storage-stability and/or higher concentration. Concentration can be carried out by known methods, for example by membrane processes or evaporation of water.

The polysilicate microgel obtained can have a molar ratio of $SiO_2:Na_2O$ within the range of from 3:1, suitably from 4:1, and preferably from 5:1, up to 50:1, suitably to 30:1 and preferably to 20:1. This ratio may depend on several factors such as, for example, type of starting materials, type of acidification of starting materials, additional metal salts, etc. The same applies the molar ratio of $SiO_2:M_2O$, where M is alkali metal, e.g. Li, Na, K and mixtures thereof. The polysilicate microgel can have a molar ratio of $SiO_2:M_2O$ within the range of from 2:1, suitably from 2.2:1, and preferably from 3:1, up to 50:1, suitably to 30:1, and preferably to 20:1. Preferably the polysilicate microgel is anionic in nature. The obtained aqueous polysilicate microgel, or silica-based microparticulate material, generally have a pH below 14, suitably below 13 and preferably below 12. Usually pH is above 6 and suitably above 9.

The high-concentration polysilicate microgel of this invention can be diluted or mixed with aqueous solutions or suspensions before use or at use. Hereby low-concentration polysilicate microgels can be formed and the high-concentration polysilicate microgel of the invention can thus be used as a precursor for low-concentration polysilicate microgels. In a preferred embodiment, the high-concentration polysilicate microgel is mixed with an aqueous solution or suspension having a pH lower than that of the high-concentration microgel whereby the high-concentration microgel undergoes a pH transition. Suitable aqueous solutions and suspensions include those containing acids, cellulosic fibres and optional filler, and acid aluminium salts.

The polysilicate microgel obtained by the process can be described as a silica-based microparticulate material comprising very small particles, preferably 1-2 nm in diameter, which are linked together in chains or networks to form three-dimensional structures. The aqueous polysilicate microgels may also contain larger particles depending on, inter alia, the starting materials used in the preparation of the microgels. The specific surface area of the silica-based microparticles, the microgel, is suitably at least 1000 $m^2/g$ and usually up to about 1700 $m^2/g$. Methods for measuring the specific surface area are described hereinabove.

The polysilicate microgels of this invention are suitable for use as flocculating agents, for example in the production of pulp and paper and within the field of water purification, both for purification of different kinds of waste water and for purification specifically of white water from the pulp and paper industry. The polysilicate microgels can be used as flocculating agents in combination with organic polymers which can be selected from anionic, amphoteric, nonionic and cationic polymers and mixtures thereof. The use of such polymers as flocculating agents is well known in the art. The polymers can be derived from natural or synthetic sources, and they can be linear or branched. Examples of generally suitable polymers include anionic, amphoteric and cationic starches, anionic, amphoteric and cationic guar gums, and anionic, amphoteric and cationic acrylamide-based polymers, as well as cationic poly(diallyldimethyl ammonium chloride), cationic polyethylene imines, cationic polyamines, polyamidoamines and vinylamide-based polymers, melamine-formaldehyde and urea-formaldehyde resins. Suitably the polysilicate microgel is used in combination with at least one cationic or amphoteric polymer, preferably cationic polymer. Cationic starch and cationic polyacrylamide are particularly preferred polymers and they can be used singly, together with each other or together with other polymers, e.g. other cationic polymers or anionic polyacrylamide. Even if arbitrary order of addition can be used, it is preferred that the polymer or polymers be added to pulp, stock or water before the polysilicate microgels.

The preferred field of use for the polysilicate microgels, in combination with polymer as described above, is for improvement of drainage and/or retention in the manufacture of paper, i.e. the use as drainage and/or retention aids in papermaking. The present invention further relates to a process for the production of paper from a suspension of cellulosic fibres, and optional fillers, which comprises adding to the suspension at least one cationic or amphoteric organic polymer and polysilicate microgel as described herein, forming and draining the suspension on a wire. The invention thus relates to a process as further defined in the claims.

When using the polysilicate microgels in combination with organic polymer(s) as mentioned above, it is further preferred to use at least one anionic trash catcher (ATC). ATC's are known in the art as neutralizing agents for detrimental anionic substances present in the stock. Hereby ATC's can enhance the efficiency of other additives used in the process. Accordingly, further suitable combinations of polymers that can be co-used with the polysilicate microgels of this invention include ATC in combination with high molecular weight polymer(s), e.g. cationic starch and/or cationic polyacrylamide, anionic polyacrylamide as well as cationic starch and/or cationic polyacrylamide in combination with anionic polyacrylamide. Suitable ATC's include cationic polyelectrolytes, especially low molecular weight highly charged cationic organic polymers such as polyamines, polyethyleneimines, homo- and copolymers based on diallyldimethyl ammonium chloride, (meth)acrylamides and (meth)acrylates. Normally, ATC's are added to the stock prior to other polymer(s). Alternatively, the ATC polymer can be added simultaneously with the other polymer(s), either separately or in admixture, for example as disclosed in European Pat. Appl. No. 752496, the teaching of which is incorporated herein by reference. Mixtures comprising ATC polymer and high molecular weight cationic polymer are particularly preferred.

The amount of polysilicate microgel added to the stock, or suspension of cellulosic fibres, may vary within wide limits depending on, among other things, type of stock, type of polysilicate microgel used. The amount usually is at least 0.01 kg/ton and often at least 0.05 kg/ton, calculated as $SiO_2$ and based on dry stock system, i.e. cellulosic fibres and optional fillers. The upper limit can be 8 kg/ton and suitably is 5 kg/ton. Usually the polysilicate microgel dosage is within the range of from 0.1 to 2 kg/ton.

The dosage of organic polymer to the stock can be varied over a broad range depending on, among other things, the type of polymer or polymers used and whether other effects are desired, e.g. wet and dry paper strength. Usually, there is used at least 0.005 kg of polymer per ton of dry fibres and optional fillers. For synthetic cationic polymers, such as for example cationic polyacrylamide, amounts of at least 0.005 kg/ton are usually used, calculated as dry on dry fibres and optional fillers, suitably from 0.01 to 3 and preferably from 0.03 to 2 kg/ton. For cationic polymers based on carbohydrates, such as cationic starch and cationic guar gum, amounts of at least 0.05 kg/ton, calculated as dry on dry fibres and optional fillers, are usually used. For these polymers the amounts are suitably from 0.1 to 30 kg/ton and preferably from 1 to 15 kg/ton.

In a preferred embodiment of this invention, the polysilicate microgels are used as drainage and/or retention aids in combination with at least one organic polymer, as described above, and at least one aluminium compound. Aluminium compounds can be used to further improve the drainage and/or retention performance of stock additives comprising polysilicate microgels and aluminated polysilicate microgels. Suitable aluminium salts include alum, aluminates, aluminium chloride, aluminium nitrate and polyaluminium compounds, such as polyaluminium chlorides, polyaluminium sulphates, polyaluminium compounds containing both chloride and sulphate ions, polyaluminium silicate-sulphates, and mixtures thereof. The polyaluminium compounds may also contain other anions, for example anions from phosphoric acid, organic acids such as citric acid and oxalic acid. Prefered aluminium salts include sodium aluminate, alum and polyaluminium compounds. The aluminium compound can be added before, simultaneously with or after the addition of the polysilicate microgel. In many cases, it is often suitable to add the aluminium compound to the stock early in the process, for example prior to the other additives. Alternatively, or additionally, the aluminium compound can be added simultaneously with the polysilicate microgel at essentially the same point, either separately or in admixture with it, for example as disclosed in European Pat. Appl. No. 748897, the teachings of which is incorporated herein by reference. Adding the polysilicate microgels and aluminium compound simultaneously to the stock represent a preferred embodiment of the invention.

The amount of aluminium compound added to the suspension may depend on the type of aluminium compound used and whether other effects are desired. It is for instance well-known in the art to utilize aluminium compounds as precipitants for rosin-based sizes. The amount of aluminium compound added to the stock should suitably be at least 0.001 kg/ton, calculated as $Al_2O_3$ and based on dry fibres and optional fillers. Suitably the amount is within the range of from 0.01 to 5 kg/ton and preferably from 0.05 to 1 kg/ton.

The papermaking process according to the invention can be used for producing cellulosic products in sheet or web form such as for example pulp sheets and paper. It is preferred that the process is used for the production of paper. The term "paper", as used herein, of course include not only paper and the production thereof, but also other sheet or web-like products, such as for example board and paperboard, and the production thereof. The papermaking process according to the invention can be used in the production of sheet or web-like products from different types of suspensions containing cellulosic fibres and the suspension, or stock, should suitably contain at least 50% by weight of such fibres, based on dry substance. The suspension can be based on fibres from chemical pulp, such as sulphate and sulphite pulp, thermomechanical pulp, chemo-thermomechanical pulp, refiner pulp or groundwood pulp from both hardwood and softwood, and can also be used for suspensions based on recycled fibres. The suspension can also contain mineral fillers of conventional types, such as for example kaolin, titanium dioxide, gypsum, talc and both natural and synthetic calcium carbonates. The suspension can have a pH within the range from about 3 to about 10. The pH is suitably above 3.5 and preferably within the range of from 4 to 9. The stock can of course also contain papermaking additives of conventional types, such as wet-strength agents, stock sizes based on rosin, ketene dimers or alkenyl succinic anhydrides, and the like.

The invention is further illustrated in the following Examples which, however, are not intended to limit same. Parts and % relate to parts by weight and % by weight, respectively, unless otherwise stated.

EXAMPLE 1

Polysilicate microgels of this invention were prepared by slowly adding a silica-based sol to sodium water glass (hereafter Na silicate) having a $SiO_2$ content of about 28% by weight and a molar ratio of $SiO_2:Na_2O$ of about 3.3 at 50° C. under vigorous stirring. In some tests, water and/or an additional alkali metal salt, either potassium borate ($KBO_2$ (aq); 57% active) and/or lithium hydroxide (LiOH (aq); 97% $LiOH.H_2O$), were introduced into the mixture thus obtained. The silica-based sols used were the following:

A: A sol of colloidal silica of the type described in U.S. Pat. No. 4,388,150. The sol was alkali-stabilized to a molar ratio of $SiO_2:Na_2O$ of about 40, had a pH of about 8-9 and a $SiO_2$ content of about 15% by weight and contained silica particles with a specific surface area of about 500 $m^2/g$.

B: A sol of colloidal silica having a $SiO_2$ content of 40% by weight and containing silica particles with a specific surface area of 220 $m^2/g$. This sol is commercially available under the tradename Bindzil™ 40/220, Eka Chemicals.

C: A sol of aluminium-modified silicic acid of the type described in U.S. Pat. Nos. 4,961,825 and 4,980,025. The sol had a pH of about 8-9 and a $SiO_2$ content of about 15% by weight and contained silica particles with a specific surface area of about 500 $m^2/g$.

Table I below shows the amounts (Amt.(g)) of starting materials used in the process, and the molar ratios of $SiO_2:Na_2O$ and $SiO_2:M_2O$ ($SiO_2:Na_2O/SiO_2:M_2O$), where M is alkali metal (Na+K+Li), and the content of $SiO_2$, in % by weight ($SiO_2$ (%)), of the aqueous polysilicate microgel obtained.

TABLE I

| Product No. | Na silicate Amt. (g) | $SiO_2$ sol Type/ Amt. (g) | $KBO_2$ (aq) Amt (g) | LiOH (aq) Amt. (g) | $SiO_2:Na_2O/$ $SiO_2:M_2O$ | $SiO_2$ (%) |
|---|---|---|---|---|---|---|
| 1 | 300 | A/319 | 18.8 | 11.7 | 5.0/3.4 | 19.5 |
| 2 | 300 | A/319 | — | 11.7 | 5.0/3.8 | 19.5 |
| 3 | 500 | A/150 | — | — | 3.8/3.8 | 24.1 |
| 4 | 500 | B/180 | 30.4 | 18.9 | 5.0/3.4 | 23.0 |
| 5 | 500 | B/180 | — | 18.9 | 5.0/3.8 | 23.0 |
| 6 | 400 | B/231 | — | 18.4 | 6.0/4.3 | 23.0 |
| 7 | 300 | C/325 | — | 11.7 | 5.0/3.8 | 19.4 |
| 8 | 300 | C/325 | — | 17.2 | 5.0/3.4 | 16.1 |
| 9 | 300 | C/325 | — | 11.7 | 5.0/3.8 | 19.0 |
| 10 | 500 | C/153 | — | — | 3.8/3.8 | 19.6 |

EXAMPLE 2

Stability of polysilicate microgels according to Example 1 was evaluated by measuring the viscosity 1, 3, 5 or 10 days after preparation. The viscosity measurements were made at 20° C. with a Brookfield viscosimeter model RTV, spindle 61, 60 rpm. The results are set forth in Table II.

TABLE II

| Product | SiO$_2$ | Viscosity (cP) at 20° C. | | | |
|---|---|---|---|---|---|
| No. | (%) | 1 day | 3 days | 5 days | 10 days |
| 1 | 19.5 | — | 14 | 14 | 13 |
| 2 | 19.5 | — | 11 | 11 | 11 |
| 3 | 24.1 | — | 55 | 58 | 61 |
| 4 | 23.0 | 29 | — | 52 | — |
| 5 | 23.0 | 19 | — | 28 | — |
| 6 | 23.0 | 27 | — | 34 | — |
| 7 | 19.4 | 11 | — | 6 | — |
| 8 | 16.1 | 6 | — | 6 | — |
| 9 | 19.0 | 7 | — | 7 | — |
| 10 | 19.6 | 12 | — | 12 | — |

EXAMPLE 3

In the following tests, drainage and retention performance of polysilicate microgels according to Example 1 was tested. Drainage performance was evaluated by means of a Dynamic Drainage Analyser (DDA), available from Akribi, Sweden, which measures the time for draining a set volume of stock through a wire when removing a plug and applying a vacuum to that side of the wire opposite to the side on which the stock is present. Retention performance was evaluated by means of a nephelometer by measuring the turbidity of the filtrate, the white water, obtained by draining the stock.

The tests were made using an alkaline stock at pH 8.0 and 0.25% consistency containing cellulosic fibres (60% bleached birch/40% pine sulphate) and 30% of chalk to which stock 0.3 g/l of Na$_2$SO$_4$.10H$_2$O was added. In the tests, the polysilicate microgels were tested in conjunction with a cationic polymer, Raisamyl 142, which is a conventional medium-high cationized starch having a degree of substitution of 0.042, which was added to the stock in an amount of 12 kg/ton, calculated as dry on dry stock system, and an aluminium salt, sodium aluminate, which was added in an amount of 0.2 kg/ton, calculated as Al$_2$O$_3$ and based on dry stock system.

The stock was stirred in a baffled jar at a speed of 1500 rpm throughout the test and chemical additions to the stock were conducted as follows:
i) adding cationic starch followed by stirring for 30 seconds,
ii) adding polysilicate microgels and aluminium salt simultaneously but separately followed by stirring for 15 seconds,
iii) draining the stock while automatically recording the drainage time.

Table III shows the results obtained when using varying dosages (kg/ton, calculated as SiO$_2$ and based on dry stock system) of polysilicate microgels. Without addition of chemicals, the stock had a drainage time of 19.5 sec and a turbidity of 93 NTU.

TABLE III

| Product | Drainage time (sec)/Turbidity (NTU) at SiO$_2$ dosage of | | | | |
|---|---|---|---|---|---|
| No. | 0.5 kg/ton | 0.8 kg/ton | 1.2 kg/ton | 1.7 kg/ton | 2.2 kg/ton |
| 1 | 15.0/— | 10.5/53 | 8.7/56 | 7.2/48 | 6.2/48 |
| 2 | 16.5/— | 12.3/73 | 9.9/61 | 9.1/62 | 8.9/60 |
| 3 | 15.2/— | 14.5/— | 12.8/— | 12.0/— | 12.0/— |
| 4 | 14.3/— | 10.9/69 | 8.0/55 | 6.5/52 | 6.2/48 |

TABLE III-continued

| Product | Drainage time (sec)/Turbidity (NTU) at SiO$_2$ dosage of | | | | |
|---|---|---|---|---|---|
| No. | 0.5 kg/ton | 0.8 kg/ton | 1.2 kg/ton | 1.7 kg/ton | 2.2 kg/ton |
| 6 | 14.6/— | 10.3/65 | 8.2/60 | 7.5/55 | 7.7/54 |
| 8 | 17.2/— | 15.0/— | 13.1/— | 11.5/— | 10.7/— |

EXAMPLE 4

Polysilicate microgels of this invention were prepared by mixing at room temperature sodium water glass (hereafter Na silicate) having a SiO$_2$ content of about 23% by weight and a molar ratio SiO$_2$:Na$_2$O of about 3.3 with an acid ion-exchanger treated sodium silicate solution (Acid SiO$_2$) having a SiO$_2$ content of about 5-6% by weight and pH of about 2.5 to achieve a mixture with a molar ratio SiO$_2$:Na$_2$O of about 4.0, followed by slowly adding a sodium aluminate solution (Natal (aq)) containing about 2.5% by weight of Al$_2$O$_3$ under vigorous stirring, or by adding an aqueous solution of an additional alkaline earth salt, either magnesium acetate (M; 1.5% Mg(acetate)$_2$) or calcium nitrate (C; 2.5% Ca(NO$_3$)$_2$).

Table IV shows the amounts (Amt.(g)) of the starting materials used in the process, and the pH and silica content, in % by weight, of the polysilicate microgels obtained.

TABLE IV

| Product No. | Na silicate Amt. (g) | Acid SiO$_2$ Amt. (g) | NaAl (aq.) Amt (g) | Salt (aq) Type/Amt. (g) | pH | SiO$_2$ (%) |
|---|---|---|---|---|---|---|
| 11 | 320 | 237 | 34.3 | — | 11.3 | 18.8 |
| 12 | 140 | 250 | — | M/57 | 10.9 | 12.1 |
| 13 | 129 | 100 | — | C/21 | 11.5 | 13.9 |

EXAMPLE 5

The polysilicate microgels according to Example 5 were tested for drainage and retention performance as in Example 3 using a similar stock of pH 8.4 and the same cationic starch, aluminium salt, dosages and order of addition.

Table V shows the results obtained by using polysilicate microgels in varying amounts, in kg/ton, calculated as SiO$_2$ and based on dry stock system. Without addition of chemicals, the stock had a drainage time of 21.2 sec and a turbidity of 104 NTU.

TABLE V

| Product | Drainage time (sec)/Turbidity (NTU) at SiO$_2$ dosage of | | | |
|---|---|---|---|---|
| No. | 0.5 kg/ton | 0.8 kg/ton | 1.2 kg/ton | 1.7 kg/ton |
| 11 | 15.2/84 | 12.0/74 | 11.6/66 | 7.9/— |
| 12 | 13.9/82 | 11.1/70 | 9.9/62 | 7.5/— |
| 13 | 15.7/81 | 11.1/72 | 9.7/64 | 7.0/— |

EXAMPLE 6

Aluminated polysilicate microgels according to the invention were prepared by mixing sodium water glass with a SiO$_2$ content of about 23% by weight and molar ratio SiO$_2$:Na$_2$O of about 3.3 with an acid ion-exchanger treated sodium silicate solution having a SiO$_2$ content of about 5-6% by weight and pH of about 2.5 to achieve a mixture having a molar ratio $SiO_2:Na_2O$ of about 10:1 followed by adding a dilute sodium aluminate solution (NaAl (aq)) containing about 2.5% by weight of $Al_2O_3$ under stirring.

Table VI shows the $SiO_2$ and $Al_2O_3$ contents of the products obtained as well as their stability and molar ratio of $SiO_2$:$Na_2O$. Stability was evaluated visually about 1 week after preparation.

TABLE VI

| Product No. | $SiO_2$ (%) | $Al_2O_3$ (%) | Stability | $SiO_2:Na_2O$ (molar ratio) |
|---|---|---|---|---|
| 14 | 10.7 | 0.4 | OK | 7.5 |
| 15 | 10.7 | 0.6 | OK | 6.2 |

EXAMPLE 7

The polysilicate microgels according to Example 6 were tested for drainage and retention performance as in Example 3 using a similar stock at pH 8.4 and 0.27% consistency, except that no aluminium salt was added separately to the stock. The cationic starch and order of addition used in Example 3 were similarly used in this test series.

Table VII shows the results obtained when adding the polysilicate microgels in varying amounts, in kg/ton, calculated as $SiO_2$ and based on dry stock system. Without addition of chemicals, the stock had a drainage time of 21.5 sec and a turbidity of 97 NTU.

TABLE VII

| Product | Drainage time (sec)/Turbidity (NTU) at $SiO_2$ dosage of | | | | |
|---|---|---|---|---|---|
| No. | 0.3 kg/ton | 0.6 kg/ton | 1.0 kg/ton | 1.5 kg/ton | 2.0 kg/ton |
| 14 | 16.5/81 | 12.0/83 | 9.0/56 | 8.0/47 | 7.5/— |
| 15 | 16.0/72 | 12.2/— | 9.0/54 | 7.5/49 | 7.5/44 |

We claim:

1. A process for preparing an aqueous polysilicate microgel which comprises mixing
   (i) an aqueous solution of alkali metal silicate with
   (ii) an aqueous phase of silica-based material having a pH within the range of from 7 to 11, which is selected from the group consisting of silica-based sols, fumed silica, silica gels, precipitated silicas and acidified solutions of alkali metal silicates, and
   (iii) a metal salt other than an aluminum salt, wherein the metal salt is based on an alkali metal or alkaline earth metal and has an anion selected from of the group consisting of borate, nitrate, chloride, formate and acetate, wherein the polysilicate microgel has a specific surface area of at least 1000 $m^2/g$.

2. The process of claim 1, wherein the metal salt is based on an alkali metal or alkaline earth metal and it has an anion, and the anion is borate, nitrate or acetate.

3. The process of claim 1, wherein the metal salt is a borate.

4. The process of claim 1, wherein the polysilicate microgel obtained has a molar ratio $SiO_2:M_2O$, where M is alkali metal, between 3:1 and 20:1.

5. The process of claim 1, wherein the aqueous polysilicate microgel obtained has a $SiO_2$ content of at least 5% by weight.

6. The process of claim 5, wherein the aqueous polysilicate microgel obtained has a $SiO_2$ content of at least 15% by weight.

7. The process of claim 1, wherein the aqueous polysilicate microgel prepared by the process is anionic.

8. The process of claim 1, further comprising a step of diluting the aqueous polysilicate microgel by adding an aqueous solution or suspension.

9. The process of claim 1, wherein the aqueous solution of alkali metal silicate, component (i), has a pH of at least about 13.

10. The process of claim 1, wherein the aqueous phase of silica-based material, component (ii), has a pH of up to 10.6.

11. A process for preparing an aqueous polysilicate microgel which comprises mixing
    (i) an aqueous solution of alkali metal silicate with
    (ii) an aqueous phase of silica-based material having a pH within the range of from 7 to 11, which is selected from the group consisting of silica-based sols, fumed silica, silica gels, precipitated silicas and acidified solutions of alkali metal silicates, and
    (iii) a metal salt, wherein the aqueous polysilicate microgel obtained has a molar ratio of $SiO_2:M_2O$, where M is alkali metal, between 3:1 and 20:1,
    wherein the polysilicate microgel has a specific surface area of at least 1000 $m^2/g$.

12. The process of claim 11, wherein the salt is a metal salt other than an aluminium salt and based on an alkali metal or alkaline earth metal.

13. The process of claim 12, wherein the salt is a borate.

14. The process of claim 11, wherein the aqueous polysilicate microgel obtained has a $SiO_2$ content of at least 15% by weight.

15. The process of claim 11, wherein the aqueous polysilicate microgel prepared by the process is anionic.

16. The process of claim 11, further comprising a step of diluting the aqueous polysilicate microgel by adding an aqueous solution or suspension.

17. The process of claim 11, wherein the aqueous solution of alkali metal silicate, component (i), has a pH of at least about 13.

18. The process of claim 11, wherein the aqueous phase of silica-based material, component (ii), has a pH of up to 10.6.

19. The process of claim 11, wherein the aqueous polysilicate microgel obtained has a $SiO_2$ content of at least 5% by weight.

20. The process of claim 11, further comprising mixing components (i) and (ii) with (iii) an aluminium salt.

21. The process of claim 20, wherein the aluminium salt, component (iii), is sodium aluminate.

22. The process of claim 11, wherein the aqueous solution of alkali metal silicate, component (i), is an aqueous solution of sodium silicate.

23. The process of claim 11, wherein the aqueous phase of silica-based material, component (ii), is an acidified solution of an alkali metal silicate.

24. The process of claim 23, wherein the acidified solution of an alkali metal silicate, component (ii), is sodium silicate.

25. The process of claim 23, wherein the acidified solution of an alkali metal silicate, component (ii), is an alkali metal silicate that has been both acidified and aluminated.

* * * * *

UNITED STATES PATENT AND TRADEMARK OFFICE
CERTIFICATE OF CORRECTION

PATENT NO. : 7,662,306 B2  Page 1 of 1
APPLICATION NO. : 09/455102
DATED : February 16, 2010
INVENTOR(S) : Persson et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 431 days.

Signed and Sealed this

Thirtieth Day of November, 2010

David J. Kappos
*Director of the United States Patent and Trademark Office*